(12) United States Patent
Wacker et al.

(10) Patent No.: US 7,136,638 B2
(45) Date of Patent: Nov. 14, 2006

(54) METHOD AND SYSTEM FOR ANALYZING A NETWORK ENVIRONMENT AND NETWORK PARAMETERS

(75) Inventors: Achim Wacker, Espoo (FI); Antti Kuurne, Espoo (FI); Harri Holma, Irving, TX (US); Jussi Reunanen, River Place Condominium (SG)

(73) Assignee: Nokia Corporation, Espoo (FI)

( * ) Notice: Subject to any disclaimer, the term of this patent is extended or adjusted under 35 U.S.C. 154(b) by 363 days.

(21) Appl. No.: 10/279,953

(22) Filed: Oct. 25, 2002

(65) Prior Publication Data
US 2004/0198234 A1 Oct. 7, 2004

(51) Int. Cl.
*H04Q 7/20* (2006.01)

(52) U.S. Cl. .................. 455/424; 455/422.1; 455/447; 455/450; 455/452.2; 455/453; 455/67.11; 455/516; 455/63.1; 455/423

(58) Field of Classification Search ............. 455/67.13, 455/67.11, 466, 436, 422.1, 446–449, 452.2, 455/453, 525, 423, 424, 63.1, 63.3
See application file for complete search history.

(56) References Cited
U.S. PATENT DOCUMENTS

| | | | | |
|---|---|---|---|---|
| 2003/0002525 A1* | 1/2003 | Grilli et al. | ................. | 370/465 |
| 2003/0139188 A1* | 7/2003 | Chen et al. | ................. | 455/456 |
| 2003/0148791 A1* | 8/2003 | Ahn et al. | ................... | 455/559 |
| 2003/0179720 A1* | 9/2003 | Cuny | ........................ | 370/310 |
| 2004/0109431 A1* | 6/2004 | Abrahamson et al. | ...... | 370/342 |
| 2004/0142709 A1* | 7/2004 | Coskun et al. | .............. | 455/466 |
| 2004/0204035 A1* | 10/2004 | Raghuram et al. | ....... | 455/553.1 |

OTHER PUBLICATIONS

Intelligent Underlay-Overlay (IUO), 3 pgs.
Up to 70% more capacity for GSM networks, with Nokia Intelligent Frequency Hopping, Press Release, Feb. 17, 1998, 2 pgs.

* cited by examiner

*Primary Examiner*—Eliseo Ramos-Feliciano
*Assistant Examiner*—Dai Phuong
(74) *Attorney, Agent, or Firm*—Foley & Lardner LLP

(57) ABSTRACT

A method, system, device and computer program product are provided for analyzing a cellular wireless communication network of a first type. For analyzing the cellular wireless communication network of the first type, communication connection condition parameters for one cell are measured, which communication connection condition parameters are derived from signals received by a mobile station from the one cell and from a plurality of other cells. The communication connection condition parameters are transmitted to a network control element in the form of mobile measurement reports. A network analysis functionality associated with the network control element processes the mobile measurement reports and evaluates, on the basis of processing results, a potential of the one cell for a usage in a wireless communication network of a second type, and/or estimated network parameters of the wireless communication network of the second type, like network performance or network dimensioning. This is repeated in all other cells in the wireless communication network of the first type.

53 Claims, 5 Drawing Sheets

METHOD AND SYSTEM FOR ANALYZING A NETWORK ENVIRONMENT AND NETWORK PARAMETERS

BACKGROUND OF THE INVENTION

1. Filed of the Invention

The present invention relates to a method and/or a system and/or a device and/or a computer program product for analyzing a cellular wireless communication network of a first type in order to evaluate whether cell sites of the cellular wireless communication network of the first type are usable as cell sites for a cellular wireless communication network of a second type, and/or for evaluating parameters of the cellular wireless communication network of the second type, such as network performance, network dimensioning, optimization parameters, and the like.

2. Description of the Prior Art

In the last few years, an extension of wireless cellular communication networks all over the world has occurred. There exist several different network system solutions such as the European Global System for Mobile communication (GSM), the US equivalent thereof (GSM1900), North American TDMA (IS-54 or IS136), CDMAOne;(IS-95), Japanese Pacific Digital Cellular PDC, and the like, which are used in these wireless communication networks.

Additionally, there is also a constant further development of new network system solutions which are planned to supplement or to replace already existing networks. For example, the $3^{rd}$ generation Universal Mobile Telecommunication System (3G UMTS), in which IS uses Wideband Code Division Multiple Access (WCDMA) technology is used. As a further example, the further development of CDMAOne, CDMA2000, can be mentioned here.

It should be noted that these communication network solutions, e.g. GSM, 3G UMTS, and equivalent network solutions, and the corresponding network elements and properties are commonly known to persons skilled in the art so that a detailed description thereof is omitted herein. Such detailed descriptions can be found in the respective network specifications and, for example, in "GSM Networks: Protocols, Terminology, and Implementation", Gunnar Heine, Artech House mobile communication library Boston-London, 1999; "Introduction to 3G Mobile Communications", Juha Korhonen, Artech House Mobile Communication Library, Boston-London, 2001; and "WCDMA: Towards IP Mobility and Mobile Internet", Tero Ojanpera and Ramjee Prasad, Artech House Mobile Communication Library, Boston-London, 2001; "WCDMA for UMTS", Harri Holma, Antti Toskala, John Wiley and Sons Ltd., 24 Jul., 2002; "UMTS Network: Architecture, Mobility and Services", Heikki Kaaranen et al., John Wiley and Sons Ltd., 11 Jun., 2001; "GSM, GPRS and EDGE Performance—Evolution Towards 3G/UMTS", T. Halonen, Javier Romero, Juan Melero, John Wiley and Sons Ltd., 23 Apr., 2002; "Radio Network Planning and Optimization for UMTS", Jaana Laiho, Achim Wacker, Tomas Novosad, John Wiley and Sons Ltd., 29 Oct., 2001.

For the implementation of the new network system solutions, it is required to place the necessary communication equipment, such as stationary transceiver network elements and the like, at suitable locations. In other words, it is necessary to design, to found and to construct respective cell sites within the areas which are intended by a network operator to be covered with the new network system solution.

Due to the amount of already deployed sites in existing wireless communication networks, the high costs for the acquisition of new sites for a new system, and the complex and regulated processes for an acquisition of new sites in particular in urban areas, the implementation of such new network system solutions is difficult. Hence, one attractive and increasingly used option for network operators who already have an existing wireless communication network, such as a $2^{nd}$ generation GSM network, and who want to deploy a new wireless communication network, such as a 3G UMTS network, is to reuse the already existing sites. Thus, costs can be saved and already available made sites can be further used for the new network solution.

As mentioned above, when a 3G UMTS network is considered as an example, a 3G UMTS Radio Access Systems uses WCDMA technology for the air interface. One characteristic of WCDMA technology is that a frequency reuse factor of 1 is used. This means that the same frequency for communication connections is used in adjacent cells (in contrast thereto, for example, in GSM systems a frequency reuse factor of e.g. 3, 4 or 12 is commonly used, i.e. the same frequency can be used in every third, fourth or $12^{th}$ site, respectively). However, this WCDMA frequency reuse factor of one makes the interference existing in the system a critical point. Therefore, it is of utmost importance to select and configure the sites for a WCDMA based system in such a manner that the interference received and transmitted in the respective cells is as small as possible.

Thus, for the design of a new WCDMA system, in particular when it is planned to reuse existing cell cites of, e.g., a former cellular GSM communication network, an assessment of the interference situation is critical for a selection of the sites. The interference as a communication connection parameter is also essential for an estimation of capacity and quality properties of a network to be planned already in advance, namely for example in the form of a so-called other-to-own cell interference ratio.

Hitherto, a communication connection condition such as the interference situation in a network to be planned is assessed in two different ways. The first way is to simulate a network behavior with a software based radio network planning/simulating tool. The second way is to perform so-called drive tests in which test engineers drive through the network area and measure the behavior by means of special test equipment.

The first way provides the possibility to study the new network before it is actually deployed. However, for a usable test result, it is necessary to have an accurate propagation modeling and/or calibration, which can normally be achieved only by performing drive tests. However, a residual error after calibrating remains significant. On the other hand, the drive tests according to the above mentioned second way require a deployment of at least some physical parts of the new network or at least some test transmitters in the intended site locations. This results in high costs for the needed extra equipment and also for the test engineers, and is also time consuming.

In other words, conventional solutions for evaluating of network conditions and for estimating the capacity and quality of a planned 3G network are based on radio wave propagation predictions, which have the risk of being inaccurate, especially in hot spot areas where propagation conditions are almost impossible to simulate, such as in very dense urban areas, indoor areas or in the vicinity of high-rise buildings like in Manhattan or Hong Kong. Even when small-scale measurements like drive tests are used as a complement, there are still problems. Besides their costs, those drive tests can be normally performed only at a limited number of locations. Additionally, only outside and/or very limited inside measurements can be made. Furthermore, it is not possible to gain a realistic image about the behavior of actual service subscribers, such as usage of mobile/stationary terminals, calling from inside/outside, and the like.

SUMMARY OF THE INVENTION

Thus, the present invention provides an improved method and/or system and/or device and/or computer program product for analyzing an existing wireless communication network in order to evaluate a potential of cell sites of this network for a usage in a wireless communication network of another type than the existing one.

Furthermore, the present invention provides an improved method and/or system and/or device and/or computer program product which enables a reliable and low cost solution for an analysis of an existing wireless communication network and for a planning of a new wireless communication network in the area of the already existing wireless communication network.

The invention provides a method of analyzing a cellular wireless communication network of a first type, the wireless communication network of the first type comprising a plurality of cells, each cell comprising a transceiver network element for covering the cell and for conducting communications in the cell, wherein each transceiver network element transmits a signal in the wireless communication network of the first type, at least one mobile station located in one cell of the plurality cells and connected to the transceiver network element of the one cell, wherein the mobile station receives and processes the signals from the transceiver network element of the one cell and from transceiver network elements of other cells in range, and at least one network control element controls at least the transceiver network element of the one cell in which the mobile station is located, the method comprising the steps of measuring communication connection condition parameters for the one cell in which the mobile station is located, which communication connection condition parameters are derived from the signals received by the mobile station from the one cell and from a number of the other cells, transmitting the measured communication connection condition parameters to the network control element in the form of mobile measurement reports, processing the mobile measurement reports by using a network analysis functionality associated with the network control element, wherein an indicator related to a predefined communication connection condition of the wireless communication network of the first type is calculated on the basis of information in the mobile measurement reports, and evaluating, on the basis of the indicator, a potential of the one cell for a usage in a wireless communication network of a second type.

According to one aspect of the invention, the wireless communication network of the first type is a GSM based mobile communication network, wherein the network transceiver element is a base transceiver station element and the network control element is a base station controller, and the wireless communication network of the second type is a $3^{rd}$ generation wideband code division multiple access network.

According to further refinements of the method,
the step of processing the mobile measurement reports further comprises a step of registering the calculated indicator in a statistic, wherein the indicator is assigned to the one cell;

the measured communication connection condition parameters are received signal levels derived from the signals of the one cell and of the other cells;

the indicator is a other-to-own interference ratio calculated in accordance with $$i = \sum_j \frac{\sum_k f(RXLEV_k) - f(RXLEV_{\max})}{f(RXLEV_{\max})},$$

wherein i defines the other-to-own interference ratio, RXLEV defines a received signal level, $RXLEV_{max}$ defines a received signal level having a maximum value, f defines a transfer function, j defines an index running over the number of all mobile measurement reports received for the one cell, and k defines an index running from 1 to the number of the other cells included in one mobile measurement report;

the other cells to be measured may be determined on the basis of a neighboring cell list;

the other cells to be measured may be all cells in range for the mobile station;

each of the mobile measurement reports comprises an identification element for identifying the one cell and identification elements for identifying the signals from the one cell and from the other cells, associated with the measured communication connection condition parameters, wherein the number of the other cells may depend on radio conditions at the time of measurement and/or the location of the mobile station which conducts the measurements for the mobile measurement reports;

each of the mobile measurement reports comprises selected measured communication connection condition parameters, wherein the selection is based on the strongest measured values for the communication connection condition parameters derived from the signals received by the mobile station from the number of the other cells;

the step of evaluating the potential of the one cell comprises the steps of determining on the basis of the mobile measurement reports and/or of the indicator whether the one cell fulfills a preset minimum requirement for a usage in the wireless communication network of the second type and indicating on an analysis display whether the one cell is sufficient or insufficient;

the step of evaluating the potential of the one cell comprises the steps of determining on the basis of the mobile measurement reports and/or of the indicator whether the one cell fulfills a preset minimum requirement for a usage in the wireless communication network of the second type, and, if not, determining and indicating a proposal for optimizing parameters of the one cell so that the preset minimum requirement for a usage in the wireless communication network of the second type can be fulfilled;

the mobile measurement reports may be obtained for the processing before the network control element, e.g. by using the Abis interface, at the network control element, or after the network control element, e.g. when the network control element forwards the mobile measurement reports to another network element.

Furthermore, the invention is a system for analyzing a cellular wireless communication network of a first type, the wireless communication network of the first type comprising a plurality of cells, each cell comprising a transceiver network element for covering the cell and for conducting communications in the cell, wherein each transceiver network element transmits a signal in the wireless communication network of the first type, at least one mobile station located in one cell of the plurality cells and connected to the transceiver network element of the one cell, wherein the mobile station receives and processes the signals from the transceiver network element of the one cell and from transceiver network elements of other cells in range, and at least one network control element controls at least the transceiver network element of the one cell in which the mobile station is located, the system comprising measuring means for measuring communication connection condition parameters for the one cell in which the mobile station is located, which communication connection condition parameters are derived from the signals received by the mobile station from the one cell and from a number of the other cells, and for transmitting the measured communication connection condition parameters to the network control element in the form of mobile measurement reports, a processing means for processing the mobile measurement reports by using a network analysis functionality, wherein an indicator related to a predefined communication connection condition of the wireless communication network of the first type is calculated on the basis of information in the mobile measurement reports, and evaluating means for evaluating, on the basis of the indicator, a potential of the one cell for a usage in a wireless communication network of a second type.

According to on aspect of the present invention, the wireless communication network of the first type is a GSM based mobile communication network, wherein the network transceiver element is a base transceiver station element and the network control element is a base station controller, and the wireless communication network of the second type is a $3^{rd}$ generation wideband code division multiple access network.

According to further refinements of the system
the processing means for processing the mobile measurement reports further comprises a counter element which registers the calculated indicator in a statistic, wherein the indicator is assigned to the one cell;
the measured communication connection condition parameters are received signal levels derived from the signals of the one cell and of the other cells;
the indicator is a other-to-own interference ratio calculated in accordance with $$i = \sum_j \frac{\sum_k f(RXLEV_k) - f(RXLEV_{max})}{f(RXLEV_{max})},$$

wherein i defines the other-to-own interference ratio, RXLEV defines a received signal level, $RXLEV_{max}$ defines a received signal level having a maximum value, f defines a transfer function, j defines an index running over the number of all mobile measurement reports received for the one cell, and k defines an index running from 1 to the number of the other cells included in one mobile measurement report;
the other cells to be measured may be determined on the basis of a neighboring cell list;
the other cells to be measured my be all cells in range for the mobile station;
each of the mobile measurement reports comprises an identification element for identifying the one cell and identification elements for identifying the signals from the one cell and from the other cells, associated with the measured communication connection condition parameters, wherein the number of the other cells may depend on radio conditions at the time of measurement and/or the location of the mobile station which conducts the measurements for the mobile measurement reports;
each of the mobile measurement reports comprises selected measured communication connection condition parameters, wherein the selection is based on the strongest measured values for the communication connection condition parameters derived from the signals received by the mobile station from the number of the other cells;
the evaluating means for evaluating the potential of the one cell determines on the basis of the mobile measurement reports and/or of the indicator whether the one cell fulfills a preset minimum requirement for a usage in the wireless communication network of the second type and indicates on an analysis display whether the one cell is sufficient or insufficient;
the evaluating means for evaluating the potential of the one cell determines on the basis of the mobile measurement reports and/or of the indicator whether the one cell fulfills a preset minimum requirement for a usage in the wireless communication network of the second type and, if not, to determine and to indicate a proposal for optimizing parameters of the one cell so that the preset minimum requirement for a usage in the wireless communication network of the second type can be fulfilled;
the mobile measurement reports may be obtained for the processing before the network control element, e.g. by using the Abis interface, at the network control element, or after the network control element, e.g. when the network control element forwards the mobile measurement reports to another network element.

Moreover, these object are achieved, for example, by a corresponding device for analyzing a cellular wireless communication network of a first type, the wireless communication network of the first type comprising a plurality of cells, each cell comprising a transceiver network element for covering the cell and for conducting communications in the cell, wherein each transceiver network element transmits a signal in the wireless communication network of the first type, at least one mobile station located in one cell of the plurality cells and connected to the transceiver network element of the one cell, wherein the mobile station receives and processes the signals from the transceiver network element of the one cell and from transceiver network elements of other cells in range, and at least one network control element controls at least the transceiver network element of the one cell in which the mobile station is located, the device comprising a processing means for processing mobile measurement reports comprising communication connection condition parameters measured for the one cell, in which the mobile station is located, and derived from the signals received by the mobile station from the one cell and from a number of the other cells, wherein the processing means processes the mobile measurement reports by using a network analysis functionality, wherein an indicator related to a predefined communication connection condition of the wireless communication network of the first type is calculated on the basis of information in the mobile measurement reports, and evaluating means for evaluating, on the basis of the indicator, a potential of the one cell for a usage in a wireless communication network of a second type.

Furthermore, the invention is a corresponding computer program product usable for a data processing unit, comprising software code portions for performing an analysis of a cellular wireless communication network of a first type, the wireless communication network of the first type comprising a plurality of cells, each cell comprising a transceiver network element for covering the cell and for conducting communications in the cell, wherein each transceiver network element transmits a signal in the wireless communication network of the first type, at least one mobile station located in one cell of said plurality cells and connected to the transceiver network element of the one cell, wherein said mobile station receives and processes the signals from the transceiver network element of the one cell and from transceiver network elements of other cells in range, and at least one network control element controls at least the transceiver network element of the one cell in which said mobile station is located, the product, when running on the data processing unit, measuring communication connection condition parameters for the one cell in which the mobile station is located, which communication connection condition parameters are derived from the signals received by the mobile station from the one cell and from a number of the other cells, transmits the measured communication connection condition parameters to the network control element in the form of mobile measurement reports, process the mobile measurement reports by using a network analysis functionality associated with the network control element, wherein an indicator related to a predefined communication connection condition of the wireless communication network of the first type is calculated on the basis of information in the mobile measurement reports, and evaluate, on the basis of the indicator, a potential of the one cell for a usage in a wireless communication network of a second type.

Moreover, the invention is a method of analyzing a cellular wireless communication network of a first type, the wireless communication network of the first type comprising a plurality of cells, each cell comprising a transceiver network element for covering the cell and for conducting communications in the cell, wherein each transceiver network element transmits a signal in the wireless communication network of the first type, at least one mobile station located in one cell of the plurality cells and connected to the transceiver network element of the one cell, wherein the mobile station receives and processes the signals from the transceiver network element of the one cell and from transceiver network elements of other cells in range, and at least one network control element controlling at least the transceiver network element of the one cell in which the mobile station is located, the method comprising the steps of measuring communication connection condition parameters for the one cell in which the mobile station is located, which communication connection condition parameters are derived from the signals received by the mobile station from the one cell and from a number of the other cells, transmitting the measured communication connection condition parameters to the network control element in the form of mobile measurement reports, storing the mobile measurement reports in a storage device, transferring, after completion of the storing step, a set of the stored mobile measurement reports to a network analysis functionality, wherein an indicator related to a predefined communication connection condition of the wireless communication network of the first type is calculated on the basis of information in the mobile measurement reports, and a potential on of the one cell for a usage in a wireless communication network of a second type is evaluated the basis of the indicator.

Furthermore, the invention is a system for analyzing a cellular wireless communication network of a first type, the wireless communication network of the first type comprising a plurality of cells, each cell comprising a transceiver network element for covering the cell and for conducting communications in the cell, wherein each transceiver network element transmits a signal in the wireless communication network of the first type, at least one mobile station located in one cell of the plurality cells and connected to the transceiver network element of said one cell, wherein the mobile station receives and processes the signals from the transceiver network element of the one cell and from transceiver network elements of other cells in range, and at least one network control element controlling at least the transceiver network element of the one cell in which the mobile station is located, the system comprising measuring means for measuring communication connection condition parameters for the one cell in which the mobile station is located, which communication connection condition parameters are derived from the signals received by the mobile station from the one cell and from a number of the other cells, and for transmitting the measured communication connection condition parameters to the network control element in the form of mobile measurement reports, a storage for storing the mobile measurement reports in a storage device, and means for transferring, after completion of the storing step, a set of the stored mobile measurement reports to a network analysis functionality, wherein an indicator related to a predefined communication connection condition of the wireless communication network of the first type is calculated on the basis of information in the mobile measurement reports, and a potential on of the one cell for a usage in a wireless communication network of a second type is evaluated the basis of the indicator.

By virtue of the present invention, the following advantages can be achieved:

A network operator planning to deploy a new communication network in the area of an already existing communication network is able to obtain measured data about the actual network environment from users of the already existing communication network and to consider them in an network evaluation and planning process. In other words, a large amount of live data is collected in short time and the collected data directly corresponds to an actual user distribution within the cell area. The obtained realistic data leads to accurate and realistic end results in the network evaluation and planning process.

The live data measured from the actual users of the already existing communication network comprise information which can not or at least is very difficult to obtain or predicted in connection with the conventional network planning and evaluation. For example, the data comprise, at least implicitly, information about where (i.e. whether inside or outside or from moving or stationary locations) calls are most often made in the existing communication network, e.g. by processing the information about from which cell/BTS (indoor or outdoor, and the like) the measurement results are obtained. In particular knowledge about a possible indoor usage of subscriber terminals is, for example, a relevant factor for an estimation of, e.g., a later WCDMA usage pattern. Thus, network planning can be performed more efficiently since the behavior of users of the existing communication network (e.g. GSM) is, in comparison to that what can be achieved with a drive test, a more accurate basis for an estimation of the behavior of users of the communication network to be planned.

Communication connection parameters in the existing communication network can be achieved by performing live measurements in order to determine, for example, the amount of interference which is received in a cell from neighboring cells. This information is usable to estimate the interference situation, which would be given by a one to one site reuse in the new system. Furthermore, it is possible to identify the most significant contributors to interference. On the basis of this identification and of information concerning the present site deployment in the existing network, detailed recommendations for an optimum deployment strategy for the new network to be planned can be given. Hence, an improved optimization during the planning of the new communication network can be provided.

Thus, one benefit of the invention is that instead of propagation predictions (with or without complementation by drive tests) the network operator obtains directly measured information, which is also measured at the locations where cellular service users in reality need the services. Furthermore, the invention provides a new way to evaluate suitability of each site of a network of a first type (e.g. GSM) to the deployment on co-sited cell of a network of a second type (e.g. WCDMA). In other words, the invention allows a more accurate form of capacity estimation from existing network deployment and provides an improved pre-launch analysis of the network based on existing network design. In comparison to an evaluation according to the prior art, which is based on computer prediction simulations and/or drive tests, which does not give reliable or overall picture of an actual network situation, the present invention improves the accuracy of the network evaluation process, for example, in areas where a WCDMA is planned on top of GSM and GSM network traffic situation and where interference conditions need to be taken into account. As site acquisition is a challenging process in urban areas due to various regulations and property ownership situation, the present invention is in particular useful in cases where re-using of sites is considered as a preferred solution when building up the new network. The invention helps to reliable identify possible co-location places or sites in this process and saves costs and time.

The above and still further objects, features and advantages of the invention will become more apparent upon referring to the description and the accompanying drawings.

DESCRIPTION OF PREFERRED EMBODIMENTS

A best mode of carrying out the invention is illustrated in connection with FIG. 1.

Figure 1:
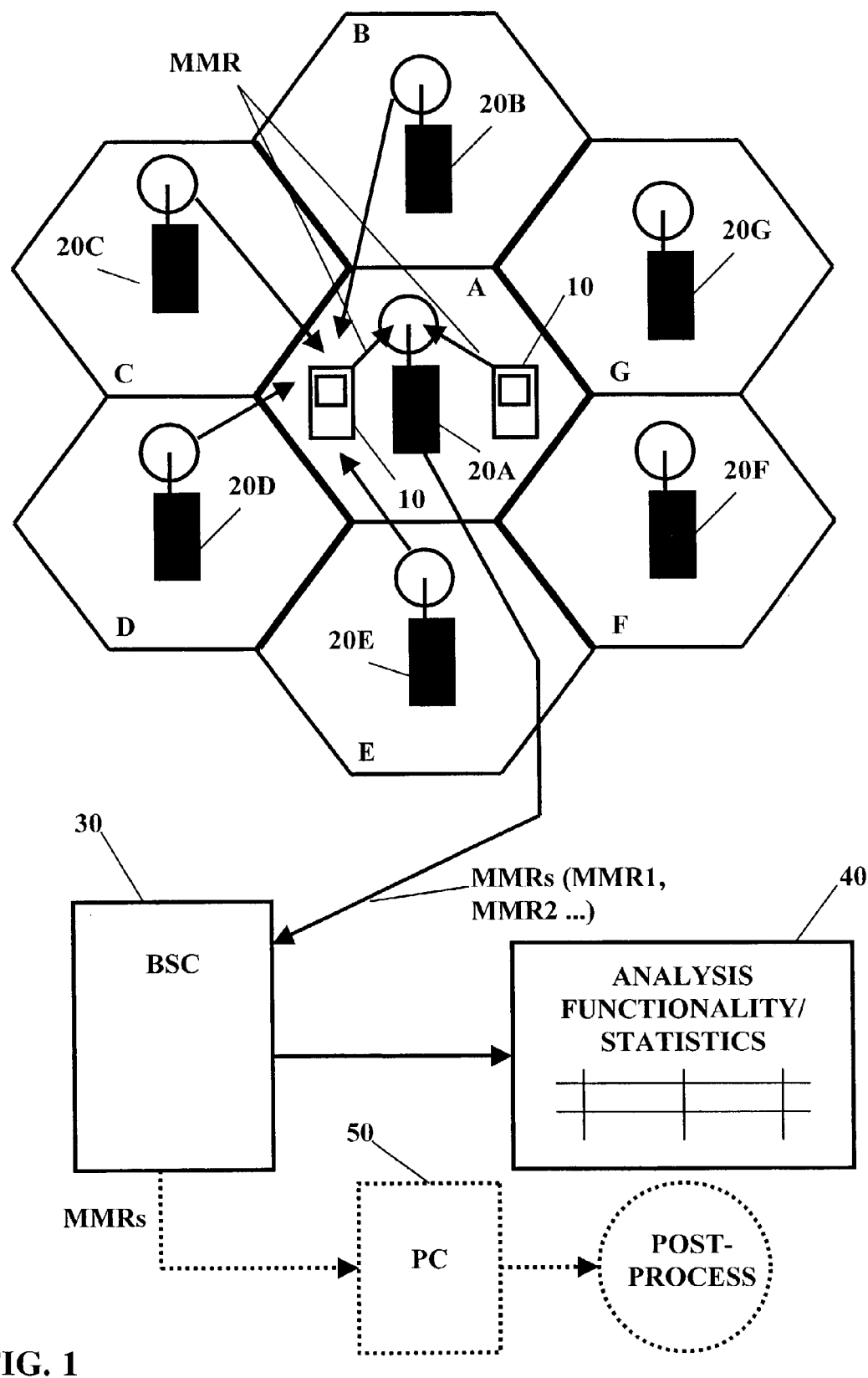
FIG. 1 shows an illustration of a network analysis system according to the present invention.

In FIG. 1, an illustration of a cellular wireless communication network is shown in which a network analysis and evaluation is performed.

According to a preferred embodiment, the wireless communication network of the first type is of a GSM type. The GSM network comprises a plurality of cells A, B, C, D, E, F, G, . . . , wherein each cell comprises a respective base transceiver station (BTS) as a transceiver network element 20A, 20B, 20C, 20D, 20E, 20F, 20G, . . . It is to be noted that the actual number of cells may vary the illustrated example and can comprise much more than the illustrated number. While the invention is applicable to a greater number, in order to simplify matters the following description related to the situation shown in FIG. 1. A cell is a coverage area of transmitter of the BTS. The size of a cell may vary in dependence of the environment, network operator specifications and the like. The purpose of the BTS is to conduct and to forward wireless (e.g. radio) communications with mobile stations 10 being located in the cell. Furthermore, each BTS transmits a specific signal, such as a beacon signal, which is propagated in the wireless communication network (indicated in FIG. 1 by arrows starting at the BTS 20A to 20G . . . wherein only a part of the beacon signals is depicted). In the case of the GSM network, this beacon signal is sent via the Broadcast Control Channel (BCCH). The BCCH is used by the BTS 20A to 20G . . . to—amongst others—inform the mobile stations 10 about network specific parameters (such as current position in the GSM network (which means the current cell in which the mobile station is located, or optionally more detailed location information, such as a coordinate set or the like), identification of the sending BTS, communication and access parameters, and the like) and can be used to determine communication connection condition parameters such as received signal levels (RXLEV) or interference levels, which will be described later.

In the example shown in FIG. 1, the mobile stations 10 are located in the cell A. In order to simplify the following description, only one mobile station 10 will be considered. The mobile station 10 is, for example, a mobile telephone, a mobile computer, a personal data assistant (PDA) or another subscriber terminal. The mobile station 10 is connected via an air interface with the BTS of the cell A. However, as commonly known, the mobile station 10 can be connected instead with another BTS of the GSM system. The mobile station 10 receives the beacon signals from the BTS in range (i.e. from the BTS 20 A to which the mobile station is connected and from BTS of neighboring or adjacent cells, e.g. from cells B to G in FIG. 1) and to process the received signals in order to determine communication connection condition parameters such as a received signal strength indicator RSSI. The various processing methods of the received signal by the mobile station 10 is commonly known by those skilled in the art and will therefore not described in greater detail. The received and/or determined communication connection condition parameters are transmitted from the mobile station 10 to the connected BTS 20A for further processing.

The BTS 20 A to 20G are connected via a specific interface to one or more network control elements 30, which are so-called Base Station Controllers (BSC) in the case of a GSM network. In FIG. 1, only one BSC 30 is shown which controls the wireless communication network cells A to G. The purpose of the BSC 30 is, for example, the control of the BTS, frequency and timing management for communication connections between the mobile station 10 and the connected BTS, and the like. The BSC 30 is usually placed separately from the BTS, associated with a (not shown) Mobile Switching Center (MSC), or the like. The BSC and the BTS are combined into a so-called Base Station System (BSS). It is to be noted that the specific network structure is not of particular relevance for the implementation of the proposed mechanism. The BTS 20 A to 20G are arranged to transmit data to the BSC 30 for a further processing, such as the communication connection condition parameters from the mobile station 10. This will be described later in greater detail. Only to simplify matters, according to FIG. 1, merely BTS 20 A is shown to be connected with the BSC 30.

Connected to the BSC 30, according to FIG. 1, an analysis functionality 40 is shown. The analysis functionality 40 represents a means to process and store data received from the GSM network (e.g. from the mobile station 10 and/or from the BTS 20 A). The analysis functionality 40 can be implemented, for example, by means of a software running in parallel to the conventional processes executed in the BSC 30, or in a separate device. In the present example, the analysis functionality 40 processes and stores data associated with predefined communication connection condition parameters, such as an interference situation, number of received base transceiver stations, measured power levels, connection quality and the like, which are collected in the GSM network, for example in the form of statistics. Then, these data may be further processed in various manners (to be explained later) in order to evaluate a potential of specific parts of the GSM network (such as cell sites thereof) for a reuse in a planned wireless communication network of another type, and/or to evaluate parameters of the planned wireless communication network of the other type. In the preferred embodiment, the wireless communication network of the other type may be a 3G UMTS network using WCDMA technology.

It is to be noted that the dashed shown elements (50) in FIG. 1 are associated with a further example which will be described later.

Figure 2:
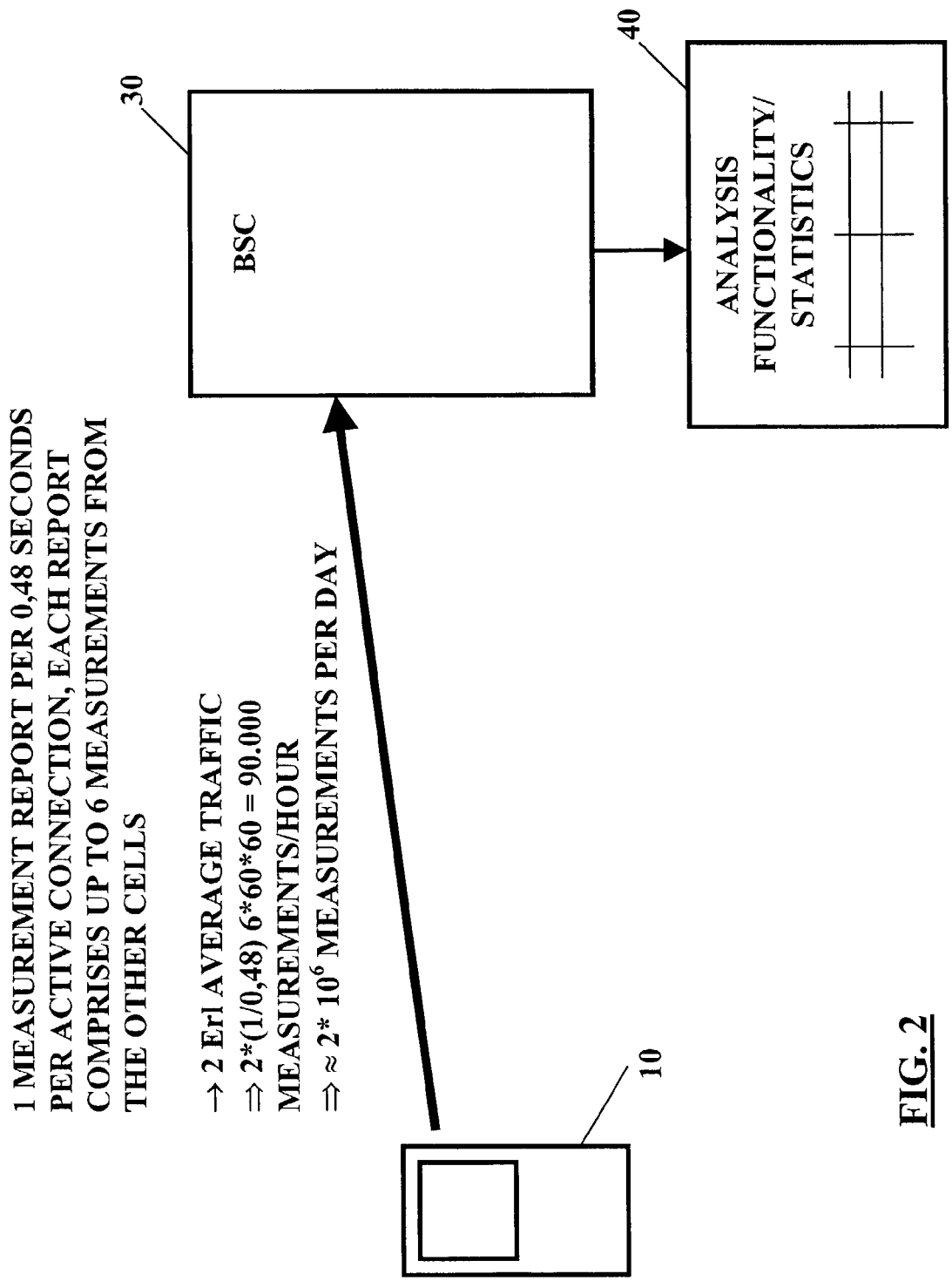
FIG. 2 shows an illustration of a signaling in the system according to FIG. 1.

In FIG. 2, a diagram is shown to illustrate an example of the collection of data of communication connection condition parameters to be performed in the GSM network. As mentioned above, the mobile station 10 receives the beacon signals (BCCH) sent by the BTS 20A to 20G in range (not shown). From these beacon signals, the mobile station 10 determines, for example, the received signal strength for each of the received BTS. The mobile station 10 may collect RSSI values for a predetermined time and a number of BTS/cells. In general, the number depends on radio conditions in the cell at the measurement time and the location of the mobile conducting the measurements for the mobile measurement reports. There are also several possibilities for further defining the number for the received BTS/cells. This definition may depend on operator settings and/or on network characteristics, such as the size or number of cells. For example, the definition of the number of the received BTS/cells may be such that all available/receivable BTS are included. Another possibility is to use a so-called neighbor cell list by the mobile stations, which is indicated to the mobile station 10, for example, by the connected BTS 20 A (also called serving BTS). In the example shown, in the GSM network, the mobile station 10 being in a dedicated mode monitors continuously the BCCH of the BTS of a number of cells which are defined, for example, in the neighbor cell list. This number of cell may be predetermined, e.g. the 6 strongest. However, the number of BTS which are measured by the mobile station 10 is not necessarily limited to these cells. The neighbor cell list may include a set of BCCH frequencies which may contain all BCCH frequencies used by the GSM network. In other words, the neighbor cell list may comprise neighbor cells and so-called undefined neighbors. Thus, any available base station in the network can be measured, also when the number of cells is determined in the basis of the neighbor cell list. From the measured signal strength values, a number (predetermined selection or all) is selected and transmitted by the mobile station 10 (via the connected BTS 20 A) to the BSC 30, for example, in the form of mobile measurement reports MMR. The MMR may comprise selected ones of all measured received signal strength values (RSSI), identification information of the BTS from which respective ones of the RSSI are derived, as well as an identification element of the transmitting mobile station 10 and of its location in the network (for example, in which cell the mobile station is located during the measurement). These identification elements can be derived in the measuring mobile station 10 from the received BCCHs. According to the example shown in FIG. 2, the selection of the RSSI in the MMR can be based on the strongest measurement values. For example, up to the six strongest RSSI measurement results are used for the MMR. The MMR is reported back via the connected base station to the BSC. To identify the source of the measurement, a base station identity code (BSIC) of the serving BTS 20 A and the BCCHs are included. It is to be noted that the latter ones are included for each measurement result, i.e. the BCCH frequency and the BSIC of all reported BTSs are included. In detail, in this example, the mobile station 10 is in a network area in which an average traffic of 2 Erl is present. In the case that one measurement report per 0,48 seconds per active connection are to be reported, wherein each report comprises up to six measurements from the other cells, i.e. that six neighboring cells (for example, derived from the neighbor cell list) per report with two reports per second and every 2nd report collected for each connection are to be considered, the MMRs reported back to the BSC comprises up to 90.000 RSSI measurements per hour, which in turn leads to more than $2*10^6$ measurements per day. It is to be noted that all mobile stations in the GSM network may report the measurement results to the BSC 30 from all GSM cells (i.e. from other serving BTS). The BSC 30 simultaneously receives the measurements from all the cells A to G connected therewith. Furthermore, to ensure an overview of the communication connection conditions in the GSM network as completely as possible, the measurements of the mobile stations may be active for at least a couple of days.

The MMRs received from the mobile station 10 are processed by the BSC 30 and registered, for example, in a statistic associated with the network analysis functionality 40. From these data it is possible to determine specific network conditions associated to the respective cell sites in the GSM network, such as interference levels, number of received base transceiver stations, measured power levels, connection quality and the like, which may be used, for example, to estimate which cell sites would receive lots of interference in other communication situations, such as a (frequency) reuse 1 situation like in WCDMA. This will be described later.

Furthermore, it is to be noted that in the network analysis system (as well as in the network analysis method described below) a plurality of mobile stations 10 are located and moving throughout the GSM network to obtain data related to communication connection condition parameters in all cell sites A to G . . . Every mobile station transmits corresponding MMRs to the BSC 30 for the further processing, and the BSC 30 processes the received MMRs from every mobile station in the GSM network correspondingly.

Figure 3:
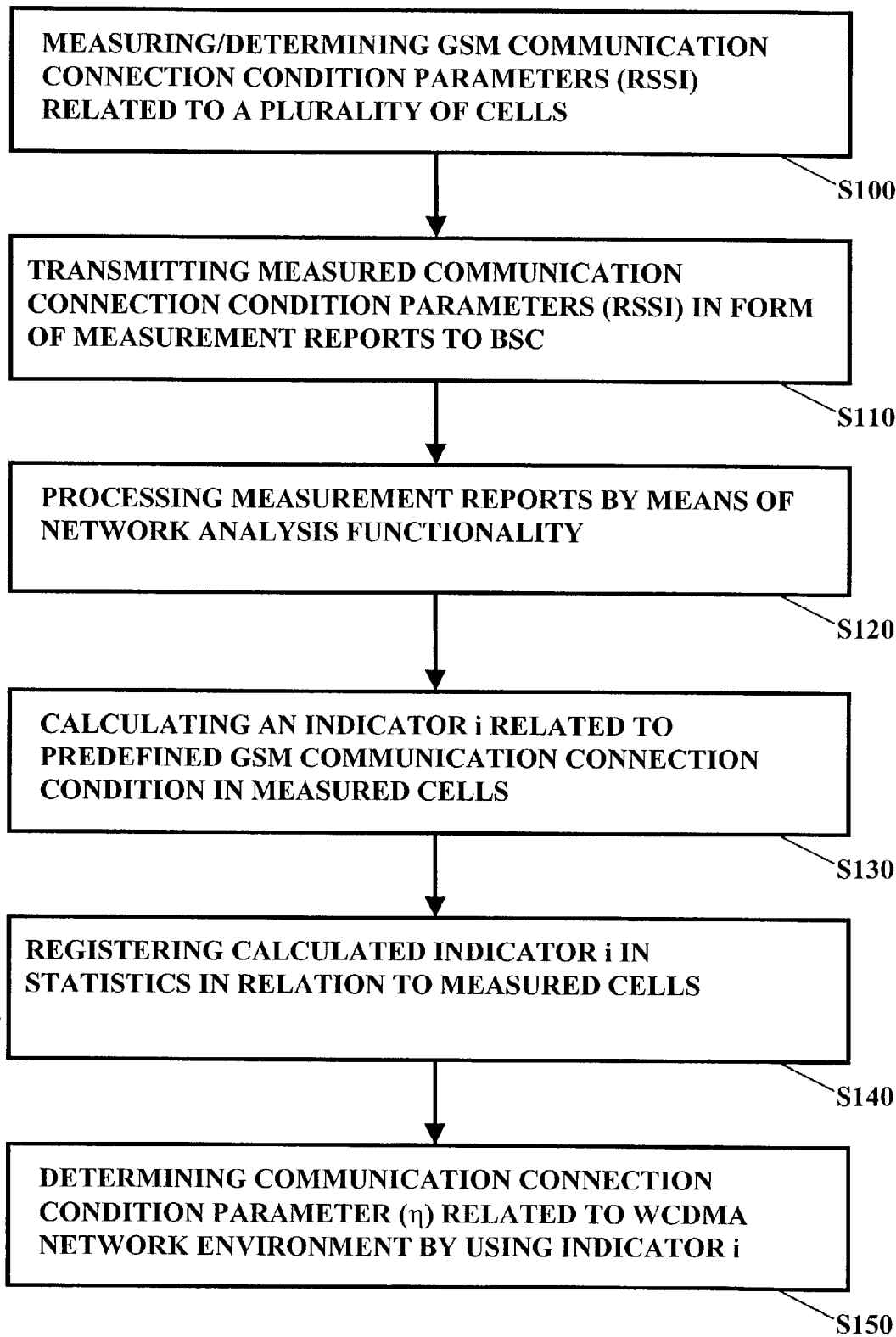
FIG. 3 shows a flow chart of a network analysis method according to the present invention.

In FIG. 3 a flowchart is shown which illustrates a method for analyzing the wireless GSM communication network shown in FIG. 1 and evaluating the potential of parts thereof in a WCDMA network.

According to the method, in a step S100, communication connection condition parameters for one cell A, in which the mobile station 10 is located, are measured. The communication connection condition parameters according to this example are received signal strength values RSSI which are derived from the BCCH signals received from the BTS 20 A of the cell A and from a number of the other neighboring cells B to G, which number is set on the basis of the above described definition (predetermined number, all, and the like). In a next step S110, the mobile station 10 transmits the measured RSSI values to the BSC 30 in the form of MMRs, for example in the manner described in connection with FIG. 2. In other words, a plurality of MMRs comprising selected received signal levels RXLEV as well as respective identification elements to determine the sources of these RXLEV are transmitted from the mobile stations 10 of the GSM network to the BSC 30 in predetermined intervals, e.g. once in every 0,48 seconds.

In step S120, the BSC 30 begins processing the received MMRs. This processing may comprise, for example, a sorting of the received MMRs or of the information comprised therein with regard to the source from which they are received, i.e. from which cell site in the GSM network they are transmitted. In the present example, this cell site is cell A. Furthermore, the BSC 30 may use the associated network analysis functionality 40 for the further processing. In detail, according to this preferred example, the network analysis functionality 40 uses the information (e.g. RSSI and identification information/element) in the MMRs to determine, for example, an indicator related to a specific communication connection condition in the respective cells (in the present case: cell A). For example, an other-to-own-cell interference ratio i is calculated (step S130) on the basis of the following equation:

$$i = \sum_j \frac{\sum_k f(RXLEV_k) - f(RXLEV_{max})}{f(RXLEV_{max})}, \tag{1}$$

wherein i defines the other-to-own interference ratio in the cell A, RXLEV defines received signal levels measured and transmitted by the mobile station (for example RSSI), $RXLEV_{max}$ defines a received signal level having a maximum value in the cell A, f defines a transfer function for transferring, for example, dBm values into Watt values, j defines an index running over the number of all mobile measurement reports received for the cell A into a predetermined time period, and k defines an index running from 1 to the number of other cells included in the same mobile measurement report (here: 1 to 6). The thus calculated indicator i can be used as an estimation of the other-to-own-cell interference in the cell A, which in turn may be used as a basis for an assumption in an analysis of a case when a co-sited WCDMA cell is deployed at the GSM cell site A. In other words, this indicator i can be used as one measure that describes how good this cell A is when reusing it for a planned WCDMA network. For an instantaneous value, equation (1) has the form $$i_{instantaneous} = \frac{\sum_{k=1}^{6} f(RSSI_{other\_cells,k})}{f(RSSI_{best\_cell})}. \tag{2}$$

The calculated indicator i can then be registered in a statistic of the network analysis functionality 40 for a further processing (step S140), wherein the indicators are preferably related to the respective cells in question. The registration can be performed, for example, on the basis of a predetermined time period which may last several hours, days or from the start to the end of the network analysis. For the registration, a (not shown) counter element or memory in the network analysis functionality 40 or in the BSC 30 may be used.

When the indicator(s) i is/are calculated, in step S150, an evaluation of the GSM network on the basis of this indicator can be performed in order to determine a potential of the GSM network sites for a usage in a WCDMA network. In other words, the communication condition parameters measured and/or calculated for the GSM network (i.e. signal strength levels, power levels, interference levels, indicator i) are used by the network analysis functionality 40 to determine (theoretically) communication condition parameters in a WCDMA usage situation of the cells in questions (in the described example of cell A). For this purpose, a communication condition in a WCDMA network environment is calculated on the basis of the results achieved by the GSM based measurements.

It is to be noted that interaction between GSM and WCDMA and interference conditions are commonly known as well as formulas to determine a specific WCDMA capacity and factors in connection with GSM conditions. There are several possible formulas that can be used to transform the reported power levels to some indicator value which describes how good one particular cell would be from reusing it for WCDMA point of view. Furthermore, there are several formulas which use the calculated indicators for the evaluation for a reuse situation in a WCDMA network. One example for such a formula is a WCDMA downlink capacity:

$$\eta_{DL} = \sum_{j=1}^{N} \upsilon \cdot \frac{(E_b/N_0)}{W/R_j} \cdot [(1-\alpha_j) + i_j], \tag{3}$$

wherein $\eta_{DL}$ is a WCDMA downlink load factor, $\upsilon$ is a service activity factor indicating discontinuous transmission, $(E_b/N_0)$ defines a ratio of Energy per Bit $(E_b)$ to Spectral Noise Density $(N_0)$, W/R defines a ratio of a spread bandwidth (W) to a transmitted data rate (R), $\alpha$ defines an orthogonality factor, i defines the other-to-own-cell interference ratio, and j defines an index running from 1 to N, wherein N is the number of connections which are established in a cell.

For the evaluation of the WCDMA communication condition, in the present case of the WCDMA downlink capacity, the calculated and above described other-to-own-cell interference ratio i represents an important factor. This other-to-own-cell interference ratio i depends, for example, on the isolation of the respective cell, i.e. the physical location of the cell in the network and antenna tilting of the BTS, as well as on the location of the user (mobile station) in the cell (when the user is closer to the BTS, i is lower). As described above, i can be determined from live measurements in the existing GSM network. Hence, the presented method provides the advantage that real measurement results can be used instead of predicted or assumed factors, such as path loss and the like. Furthermore, the measurements represent an actual user distribution in the GSM network which is substantially closer to a user distribution in the planned WCDMA network than an estimated one.

Furthermore, it is possible by using the method of the invention to determine/calculate further WCDMA related communication condition parameters in a similar manner.

For example, a downlink cell throughput can be determined when additional parameters are known. These parameters are the downlink $E_b/N_0$, for example 5 dB, the orthogonality factor α, for example 0.6, and the load factor, for example 70%. Besides this, another possible WCDMA related communication condition parameter derivable on the basis of the GSM related measurements is a WCDMA uplink coverage, which can be estimated from the measured RSSI values when additionally a used GSM BTS transmission power, a WCDMA BTS sensitivity and a relative frequency attenuation in the GSM network (for example, when a GSM 900 system is used) are known. Moreover, it is also possible, for example, to estimate a soft handover (SHO) overhead when a soft handover window is known, which is in particular useful for WCDMA RNC dimensioning and parameter settings.

The WCDMA related communication condition parameters which are determined on the basis of the measured GSM parameters can be used for an evaluation and planning of a WCDMA based network in the sites of the existing GSM network. An example of such an evaluation and planning process is shown in FIG. 4.

Figure 4:
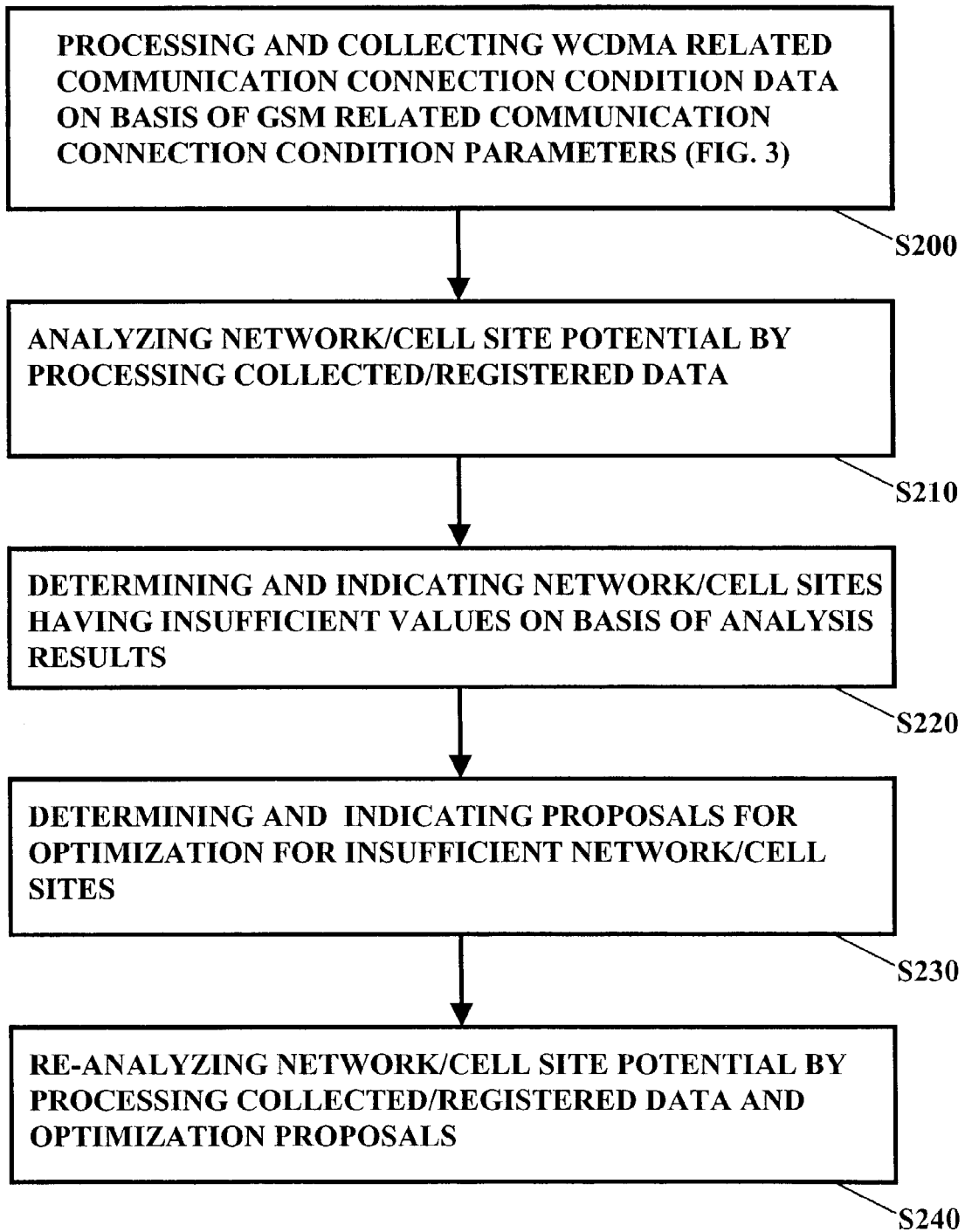
FIG. 4 shows a flow chart of a network analysis method according to the present invention.

According to FIG. 4, in step S200, the WCDMA related communication condition parameters (as described above in connection with FIG. 3) are determined on the basis of the measured and/or calculated GSM related communication condition parameters, such as the indicator i, RSSI and the like, for the respective GSM cell sites (BTS 20 A to 20G . . . in FIG. 1). These WCDMA related communication condition parameters are then, in step S210, analyzed in order to evaluate the potential of the respective cell site (cell A in the example described above) for reusing this site in the WCDMA network. In other words, it is analyzed whether the cell A in the current GSM configuration is sufficient for a WCDMA network configuration, for example, in terms of interference situations for mobile stations in the cell A. Additionally, it is possible to simulate on the basis of the measured GSM values whether the cell A provides sufficient conditions, for example, in terms of a soft handover behavior, a coverage value, a downlink throughput, and the like. In step S220, these calculated/estimated WCDMA related communication condition parameters are checked whether they fulfill minimum requirements. For this purpose, the calculated/estimated WCDMA related communication condition parameter values are compared, for example, with predefined corresponding threshold values which are stored in the network analysis functionality 40. In the case that one or more of the minimum requirements is not fulfilled (for example the interference situation is determined, on the basis of the other-to-own-cell interference ratio i, to be insufficient), this cell is indicated correspondingly to be not usable for reusing the site in the WCDMA network. The indication can be provided, for example, in the form of a analysis display for an operator which will be described later.

As a further option, the network analysis functionality 40 may be able to perform a further processing which in shown in FIG. 4 in connection with steps S230 and S240.

In step S230, the network analysis functionality 40 determines proposals for an optimization of the WCDMA network to be planned. In detail, the factors of GSM cell sites which are determined to be insufficient are determined from the forgoing step S220, and possibilities for an improvement of the communication condition parameters in the insufficient cell site are considered. This may be performed, for example, by a replacement of measured parameters in the WCDMA equations used for the evaluation of the cell. Alternatively, an iteration calculation may be performed in which predetermined factors of the calculated equations are gradually changed until a sufficient result is achieved. The elements used for the replacement and/or the iteration can be derived, for example, from data stored in the network analysis functionality. The mathematical and theoretical methods used for such a processing are commonly known and are thus not described in greater detail. The proposals for the optimization can also be indicated for an operator in the form of a suitable display.

On the basis of the optimization proposals derived in step S230, the network analysis functionality 40 re-analyzes, in step S240, the cell sites by considering the cell site parameters already determined to be sufficient in the GSM based evaluation and the optimized cell site parameters in order to check that the thus determined WCDMA related communication connection condition parameters of the planned WCDMA network completely fulfill the requirements. Thus, a complete overview of the potential of the sites of the existing GSM network for reusing in a WCDMA environment is available which also considers required changes in the network configuration at cell sites which does not originally fulfill all requirements, and a complete performance test is possible, on the basis of live-measured values. This overview as well as the results of the performance test can be displayed for an operator.

Hence, the proposed network analysis of an existing GSM network on the basis of live measured mobile station measurements in order to evaluate the potential for reusing sites thereof in a WCDMA network to be planned is useful, for example, in a selection of the existing GSM sites that are suitable for WCDMA co-siting with given coverage and/or throughput requirements, for soft handover rate estimations which feeds into RNC dimensioning and parameter settings, for WCDMA BTS hardware dimensioning in order to support traffic in the WCDMA network, for WCDMA neighboring cell list creation in intra-frequency and inter-system cases when using the given GSM sites. Besides this, the WCDMA deployment analysis and optimization processes described above are also applicable in the following cases:

proposal of soft handover parameters per cell to obtain x % soft handover overhead;

evaluation of coverage reason inter-system handover rates when using the given GSM sites;

determination of lowest number of sites to provide x % coverage for, e.g., WCDMA 64 kbps;

determination of highest throughput by using all or a part of the given GSM sites.

In other words, the measured GSM communication condition parameters can be processed to find optimal WCDMA network deployment scenarios and network setting parameters. By using measurements of neighboring/adjacent cells by the mobile stations in the existing GSM network, it is possible to define an amount of interference, which is received in a cell from other cells. This information is used, for example, to estimate the interference situation, which would be given by a one to one site reuse in the new UMTS system and by doing so support the decision whether a site is possible to be reused to deploy a new UMTS network. Additionally, parameters of the UMTS based network, such as network performance, network dimensioning, optimization parameters, and the like, are derivable from the measured GSM communication condition parameters.

Figure 5:
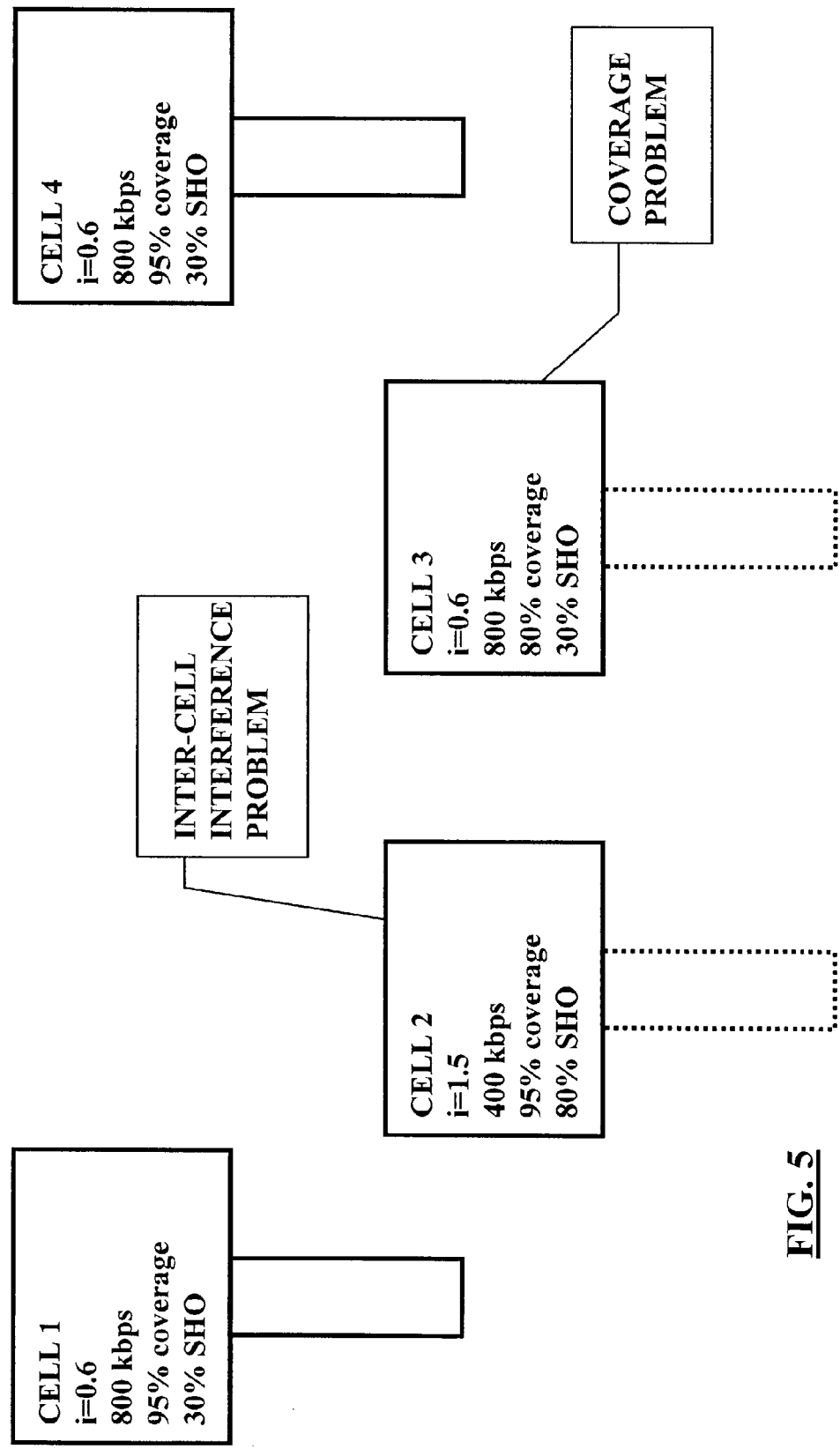
FIG. 5 shows an illustration of an analysis display result for a network analysis according to the present invention.

In FIG. 5, an example for an analysis display for an operator is shown which is displayed by the network analysis functionality after processing the communication connection condition parameters in the manner above described. It is to be noted that FIG. 5 represents merely one example, and various other types of displays can be used.

According to FIG. 5, four GSM cell sites 1 to 4 are shown. For each cell site, in descending order, the calculated other-to-own-cell interference ratio i, the determined downlink cell throughput in kilobit per second, the uplink coverage ratio in percent, and the soft handover rate in percent are indicated. In accordance with the determined/calculated results for these GSM or WCDMA related communication connection condition parameters, the network analysis functionality 40 determines cells 2 (inter-cell interference problem due to value of i) and 3 (coverage problem) to be insufficient for reusing in the WCDMA network. This is indicated by representing these cells 2 and 3 with dashed lines. Additionally, a box defining the respective reason for the insufficiency may be displayed in the display. It is obvious that in dependence of the properties and abilities of the used network analysis functionality (as described in connection with FIG. 4), the analysis display may comprise several other parameters defining respective determined GSM and/or WCDMA related communication connection condition parameters.

The network analysis functionality 40 can be implemented in the network analysis system according to FIG. 1 in the form of a software. For example, the described network analysis functionality 40 can be based on already existing network analysis tools such as the program NetAct® from the applicant. However, the proposed network analysis functionality can also be implemented as a stand alone analysis tool.

Furthermore, as mentioned above, the proposed network analysis can be implemented in the form of software/firmware. That means that a computer program product usable for a data processing unit, for example, in a operation support system (OSS) is provided. In this case, it is obvious that the involved network elements, i.e. in particular the network control element or BSC 30, requires respective means for loading and processing the computer program product. These means are, for example, commonly known input means, respective memories loaded for storing software code portions, and processing means such as a CPU for processing the software code portions. The computer program product may further comprise a medium readable by said data processing unit, on which said software code portions are stored, for example a CD-ROM, floppy disk, EEPROM and the like with are connectable and readable by respective input means. It is also possible to directly load the computer program product into an internal memory of the data processing apparatus, such as a working RAM of the CPU.

According to a further example, as mentioned above, in FIG. 1, there is also shown a further way for the network analysis. As shown in FIG. 1, the network analysis system may alternatively comprise an external data processing unit 50, such as a personal computer. In this case, the all measurement reports MMR coming from mobile stations are stored as they are before the BSC 30 discards them. When the network analysis measurements are completed, the stored MMR are post-processed off-line by means of a corresponding analysis tool which may have the same or similar functions as the one described in the first embodiment.

As a further example, the mobile measurement reports used for the analysis can be recovered from the Abis interface between the BTS and the BSC. The MMRs described above are commonly sent on this Abis interface and can be recovered therefrom without the need that the MMRs are sent to the network analysis functionality in a special way. In other words, the MMRs can be collected, for the further processing, as described above, i.e. from the BSC, or before the BSC, e.g., from the Abis interface. Also, the MMRs can be collected after the BSC, e.g., when the BSC forwards the MMRs to another (not shown) network element, such as the MSC. It is obvious, that in such a case, i.e. when the MMRs are obtained before or after the BSC, the network analysis functionality may be located separately from the BSC.

It is to be noted that there are various other ways to collect measurement reports from the mobile stations or to keep track of performance parameters (such as i) for each cell. Additionally, the invention is not limited to the other-to-own-cell interference ratio i as the only WCDMA related performance indicator. For example, the number of connections a cell is having may be considered, which relates to the required resources in a 3G network. Also, soft handover overhead (SHO), which is expected in the 3G network and which is an important performance indicator in the 3G network, may be considered, which SHO should be within reasonable limits, such as, for example, 20% to 30% in a macrocellular environment. Here, a number of sufficiently strong signals is converted into an estimation of "useful" soft handover connections in the 3G network, from which in turn the SHO can be derived. It is obvious that there are several other possibilities which are obvious for persons skilled in the art, so that the actual indicator selection is not of particular relevance.

Moreover, even though the above described embodiments are related to the case where a WCDMA based 3G UMTS network is planned to replace and/or to complement an existing GSM network, it is obvious for a person skilled in the art that the proposed network analysis is applicable also for other network solutions, such as the ones described above, or for network solutions to be developed in the future.

As described above, a method, system, device and computer program product are provided for analyzing a cellular wireless communication network of a first type. For analyzing the cellular wireless communication network of the first type, communication connection condition parameters for one cell A are measured, which communication connection condition parameters are derived from signals received by a mobile station 10 from the one cell and from a plurality of other cells A, B, C, D, E, F, G. The communication connection condition parameters are transmitted to a network control element 30 in the form of mobile measurement reports MMR. A network analysis functionality 40 associated with the network control element processes the mobile measurement reports and evaluates, on the basis of processing results, a potential of the one cell for a usage in a wireless communication network of a second type, and/or estimated network parameters of the wireless communication network of the second type, like network performance or network dimensioning. This is repeated in all other cells in the wireless communication network of the first type.

It should be understood that the above description and accompanying figures are merely intended to illustrate the present invention by way of example only. The described embodiments of the present invention may thus vary within the scope of the attached claims.

What is claimed is:

1. A method of analyzing an existing cellular wireless communication network of a first type, the existing wireless communication network of the first type comprising a plurality of cells, each cell comprising a transceiver network element for covering the cell and for conducting communications in the cell, wherein each transceiver network element transmits a signal in the existing wireless communication network of said first type; at least one mobile station located in one cell of the plurality cells and connected to the transceiver network element of the one cell, wherein the mobile station receives and processes the signals from the transceiver network element of the one cell and from transceiver network elements of other cells in range; and at least one network control element controlling at least the transceiver network element of the one cell in which the mobile station is located, the method comprising:

measuring in the existing wireless communication network of the first type communication connection condition parameters related to an interference situation for the one cell in which the mobile station is located, which communication connection condition parameters related to the interference situation are derived from the signals received by the mobile station from the one cell and from a number of the other cells;

transmitting the measured communication connection condition parameters related to the interference situation to the network control element in the form of mobile measurement reports;

processing the mobile measurement reports by using a network analysis functionality associated with the network control element, wherein an indicator related to a predefined communication connection condition including an interference determination of the existing wireless communication network of the first type is calculated on the basis of information in the mobile measurement reports; and evaluating, on the basis of the indicator related to the predefined communication connection condition including the interference determination of the existing wireless communication network of the first type, a potential for reusing the one cell in a wireless communication network of a second type which is not yet established.

2. A method according to claim 1, wherein:

the existing wireless communication network of the first type is a GSM based mobile communication network, wherein the network transceiver element is a base transceiver station element and the network control element is a base station controller, and the wireless communication network of the second type is a $3^{rd}$ generation wideband code division multiple access network.

3. A method according to claim 1, wherein:

the step of processing the mobile measurement reports further comprises registering the calculated indicator in a statistic, wherein the indicator is assigned to the one cell.

4. A method according to claim 1, wherein:

the measured communication connection condition parameters related to the interference situation are received signal levels derived from the signals of the one cell and of the other cells.

5. A method according to claim 4, wherein:

the indicator is a other-to-own interference ratio calculated in accordance with $$i = \sum_j \frac{\sum_k f(RXLEV_k) - f(RXLEV_{\max})}{f(RXLEV_{\max})},$$

wherein i defines the other-to-own interference ratio, RXLEV defines a received signal level, $RXLEV_{max}$ defines a received signal level having a maximum value, f defines a transfer function, j defines an index running over the number of all mobile measurement reports received for the one cell, and k defines an index running from 1 to the number of the other cells included in the same mobile measurement report.

6. A method according to claim 1, wherein:

the other cells to be measured are determined on the basis of a neighboring cell list.

7. A method according to claim 1, wherein:

the other cells to be measured are all cells in range for the mobile station.

8. A method according to claim 1, wherein:

each of the mobile measurement reports comprises an identification element for identifying the one cell and identification elements for identifying the signals from the one cell and from the other cells, associated with the measured communication connection condition parameters related to the interference situation.

9. A method according to claim 1, wherein:

each of the mobile measurement reports comprises selected measured communication connection condition parameters related to the interference situation, wherein the selection is based on the strongest measured values for the communication connection condition parameters related to the interference situation derived from the signals received by the mobile station from the number of the other cells.

10. A method according to claim 1, wherein:

the step of evaluating the potential of the one cell comprises:

determining on the basis of the mobile measurement reports and/or of the indicator whether the one cell fulfills a preset minimum requirement for a usage in the wireless communication network of the second type and indicating on an analysis display whether the one cell is sufficient or insufficient.

11. A method according to claim 1, wherein the step of evaluating the potential of the one cell comprises:

determining on the basis of the mobile measurement reports and/or of the indicator whether the one cell fulfills a preset minimum requirement for a usage in the wireless communication network of the second type; and if not, determining and indicating a proposal for optimizing parameters of the one cell so that the preset minimum requirement for a usage in the wireless communication network of the second type can be fulfilled.

12. A method according to claim 1, wherein:

the mobile measurement reports are obtained for the processing step before the network control element, at the network control element, or after the network control element.

13. A system for analyzing an existing cellular wireless communication network of a first type, the existing wireless communication network of said first type comprising a plurality of cells, each cell comprising a transceiver network element for covering the cell and for conducting communications in the cell, wherein each transceiver network element transmits a signal in the existing wireless communication network of the first type, at least one mobile station located in one cell of the plurality cells and connected to the transceiver network element of the one cell, wherein the mobile station receives and processes the signals from the transceiver network element of the one cell and from transceiver network elements of other cells in range, and at least one network control element controlling at least the transceiver network element of the one cell in which the mobile station is located, the system comprising:

measuring means in the existing wireless communication network of the first type for measuring communication connection condition parameters related to an interference situation for the one cell in which the mobile station is located, which communication connection condition parameters related to the interference situation are derived from the signals received by the mobile station from the one cell and from a number of the other cells, and for transmitting the measured communication connection condition parameters related to the interference situation to the network control element in the form of mobile measurement reports;

a processing means for processing the mobile measurement reports by using a network analysis functionality, wherein an indicator related to a predefined communication connection condition including an interference determination of the existing wireless communication network of the first type is calculated on the basis of information in the mobile measurement reports; and evaluating means for evaluating, on the basis of the indicator related to the predefined communication connection condition including the interference determination of the existing wireless communication network of the first type, a potential for reusing the one cell in a wireless communication network of a second type which is not yet established.

14. A system according to claim 13, wherein:
the existing wireless communication network of the first type is a GSM based mobile communication network, wherein the network transceiver element is a base transceiver station element and the network control element is a base station controller, and the wireless communication network of the second type is a $3^{rd}$ generation wideband code division multiple access network.

15. A system according to claim 13, wherein:
the processing means for processing the mobile measurement reports comprises a counter element which registers the calculated indicator in a statistic, wherein the indicator is assigned to the one cell.

16. A system according to claim 13, wherein:
the measured communication connection condition parameters related to the interference situation are received signal levels derived from the signals of the one cell and of the other cells.

17. A system according to claim 16, wherein the indicator is a other-to-own interference ratio calculated in accordance with $$i = \sum_j \frac{\sum_k f(RXLEV_k) - f(RXLEV_{\max})}{f(RXLEV_{\max})},$$

wherein i defines the other-to-own interference ratio, RXLEV defines a received signal level, $RXLEV_{max}$ defines a received signal level having a maximum value, f defines a transfer function, j defines an index running over the number of all mobile measurement reports received for the one cell, and k defines an index running from 1 to the number of the other cells included in the same mobile measurement report.

18. A system according to claim 13, wherein:
the other cells to be measured are determined on the basis of a neighboring cell list.

19. A system according to claim 13, wherein:
the other cells to be measured are all cells in range for the mobile station.

20. A system according to claim 13, wherein:
each of the mobile measurement reports comprises an identification element for identifying the one cell and identification elements for identifying the signals from one cell and from the other cells, associated with the measured communication connection condition parameters related to the interference situation.

21. A system according to claim 13, wherein:
each of the mobile measurement reports comprises selected measured communication connection condition parameters related to the interference situation, wherein the selection is based on the strongest measured values for the communication connection condition parameters derived from the signals received by the mobile station from the number of the other cells.

22. A system according to claim 13, wherein:
the evaluating means for evaluating the potential of the one cell determines on the basis of the mobile measurement reports and/or of the indicator whether the one cell fulfills a preset minimum requirement for a usage the wireless communication network of the second type and indicates on an analysis display whether the one cell is sufficient or insufficient.

23. A system according to claim 13, wherein:
the evaluating means for evaluating the potential of the one cell determines on the basis of the mobile measurement reports and/or of the indicator whether the one cell fulfills a preset minimum requirement for a usage in the wireless communication network of the second type and if not, determines and indicates a proposal for optimizing parameters of the one cell so that the preset minimum requirement for a usage in the wireless communication network of the second type can be fulfilled.

24. A system according to claim 13, wherein:
the mobile measurement reports are obtained for the processing means before the network control element, at the network control element, or after the network control element.

25. A device for analyzing an existing cellular wireless communication network of a first type, the existing wireless communication network of the first type comprising a plurality of cells, each cell comprising a transceiver network element for covering the cell and for conducting communications in the cell, wherein each transceiver network element transmits a signal in the existing wireless communication network of the first type, at least one mobile station located in one cell of the plurality cells and connected to the transceiver network element of the one cell, wherein the mobile station receives and processes the signals from the transceiver network element of the one cell and from transceiver network elements of other cells in range, and at least one network control element controlling at least the transceiver network element of the one cell in which the mobile station is located, the device comprising:
a processing means for processing mobile measurement reports comprising communication connection condition parameters measured for the one cell, in which the mobile station is located, and derived from the signals received by the mobile station from the one cell and from a number of the other cells, the communication connection condition parameters related to an interference situation, wherein the processing means processes the mobile measurement reports by using a network analysis functionality, wherein an indicator related to a predefined communication connection condition including an interference determination of the existing wireless communication network of the first type is calculated on the basis of information in the mobile measurement reports; and evaluating means for evaluating, on the basis of the indicator related to the predetermined communication connection condition including the interference determination of the existing wireless communication network of the first type, a potential for reusing the one cell in a wireless communication network of a second type which is not yet established.

26. A device according to claim 25, wherein:
the existing wireless communication network of the first type is a GSM based mobile communication network, wherein the network transceiver element is a base transceiver station element and the network control element is a base station controller, and the wireless communication network of the second type is a $3^{rd}$ generation wideband code division multiple access network.

27. A device according to claim 25, wherein:
the processing means for processing the mobile measurement reports further comprises a counter element registering the calculated indicator in a statistic, wherein the indicator is assigned to the one cell.

28. A device according to claim 25, wherein:
the measured communication connection condition parameters related to the interference situation are received signal levels derived from the signals of the one cell and of the other cells.

29. A device according to claim 28, wherein:
the indicator is a other-to-own interference ratio calculated in accordance with $$i = \sum_j \frac{\sum_k f(RXLEV_k) - f(RXLEV_{\max})}{f(RXLEV_{\max})},$$

wherein i defines the other-to-own interference ratio, RXLEV defines a received signal level, $RXLEV_{max}$ defines a received signal level having a maximum value, f defines a transfer function, j defines an index running over the number of all mobile measurement reports received for the one cell, and k defines an index running from 1 to the number of said other cells included in the same mobile measurement report.

30. A device according to claim 25, wherein:
the other cells to be measured are determined on the basis of a neighboring cell list.

31. A device according to claim 25, wherein:
the other cells to be measured are all cells in range for the mobile station.

32. A device according to claim 25, wherein:
each of the mobile measurement reports comprises an identification element for identifying the one cell and identification elements for identifying the signals from the one cell and from the other cells, associated with the measured communication connection condition parameters related to the interference situation.

33. A device according to claim 25, wherein:
each of the mobile measurement reports comprises selected measured communication connection condition parameters related to the interference situation, wherein the selection is based on the strongest measured values for the communication connection condition parameters related to the interference situation derived from the signals received by the mobile station from the number of the other cells.

34. A device according to claim 25, wherein:
the evaluating means for evaluating the potential for reusing the one cell determines on the basis of the mobile measurement reports and/or of the indicator whether the one cell fulfills a preset minimum requirement for a usage in the wireless communication network of the second type and indicates on an analysis display whether the one cell is sufficient or insufficient.

35. A device according to claim 25, wherein:
the evaluating means for evaluating the potential for reusing the one cell determines on the basis of the mobile measurement reports and/or of the indicator whether the one cell fulfills a preset minimum requirement for a usage in the wireless communication network of the second type and if not, to determine and to indicate a proposal for optimizing parameters of the one cell so that the preset minimum requirement for a usage in the wireless communication network of the second type can be fulfilled.

36. A device according to claim 25, wherein:
the mobile measurement reports are obtained for the processing means before the network control element, at the network control element, or after the network control element.

37. A computer program product embodied on a computer readable medium usable in a data processing unit, comprising software code portions for performing an analysis of an existing cellular wireless communication network of a first type, the existing wireless communication network of the first type comprising:

a plurality of cells, each cell comprising a transceiver network element for covering the cell and for conducting communications in the cell, wherein each transceiver network element transmits a signal in the existing wireless communication network of the first type;

at least one mobile station located in one cell of the plurality cells and connected to the transceiver network element of the one cell, wherein the mobile station receives and processes the signals from the transceiver network element of the one cell and from transceiver network elements of other cells in range; and at least one network control element controlling at least the transceiver network element of the one cell in which the mobile station is located;

the software code portion when executed on the data processing unit performing the steps of, measuring in the existing wireless communication network of the first type communication connection condition parameters related to an interference situation for the one cell in which the mobile station is located, which communication connection condition parameters related to the interference situation are derived from the signals received by the mobile station from the one cell and from a number of the other cells, transmitting the measured communication connection condition parameters related to the interference situation to the network control element in the form of mobile measurement reports;

processing the mobile measurement reports by using a network analysis functionality associated with the network control element, wherein an indicator (i) related to a predefined communication connection condition including an interference determination of the existing wireless communication network of the first type is calculated on the basis of information in the mobile measurement reports; and evaluating, on the basis of the indicator related to the predetermined communication connection condition including the interference determination of the existing wireless communication network of the first type, a potential for reusing the one cell in a wireless communication network of a second type which is not yet established.

38. A computer program product according to claim 37, wherein:

the computer program product is directly loadable into an internal memory of the data processing unit.

39. A computer program product according to claim 37, wherein:

the existing wireless communication network of the first type is a GSM based mobile communication network, wherein the network transceiver element is a base transceiver station element and the network control element is a base station controller, and the wireless communication network of the second type is a $3^{rd}$ generation wideband code division multiple access network.

40. A computer program product according to claim 37, wherein:

the computer program product step comprises a counter element registering the calculated indicator in a statistic, wherein the indicator is assigned to the one cell.

41. A computer program product according to claim 37, wherein:

the measured communication connection condition parameters related to the interference situation are received signal levels derived from the signals of the one cell and of the other cells.

42. A computer program product according to claim 41, wherein:

the indicator is a other-to-own interference ratio calculated in accordance with $$i = \sum_j \frac{\sum_k f(RXLEV_k) - f(RXLEV_{max})}{f(RXLEV_{max})},$$

wherein i defines the other-to-own interference ratio, RXLEV defines a received signal level, $RXLEV_{max}$ defines a received signal level having a maximum value, f defines a transfer function, j defines an index running over the number of all mobile measurement reports received for the one cell, and k defines an index running from 1 to the number of said other cells included in the same mobile measurement report.

43. A computer program product according to claim 37, wherein:

the other cells to be measured are determined on the basis of a neighboring cell list.

44. A computer program product according to claim 37, wherein:

the other cells to be measured are all cells in range for the mobile station.

45. A computer program product according to claim 37, wherein:

each of the mobile measurement reports comprises an identification element for identifying the one cell and identification elements for identifying the signals from the one cell and from the other cells, associated with the measured communication connection condition parameters related to the interference situation.

46. A computer program product according to claim 37, wherein:

each of the mobile measurement reports comprises selected measured communication connection condition parameters related to the interference situation, wherein the selection is based on the strongest measured values for the communication connection condition parameters related to the interference situation derived from the signals received by the mobile station from the number of the other cells.

47. A computer program product according to claim 37, wherein:

the computer program product is adapted to evaluate the potential for reusing the one cell by determining on the basis of the mobile measurement reports and/or of the indicator whether the one cell fulfills a preset minimum requirement for a usage in the wireless communication network of the second type and indicating on an analysis display whether the one cell is sufficient or insufficient.

48. A computer program product according to claim 37, wherein:

the computer program product is adapted to evaluate the potential for reusing the one cell by determining on the basis of the mobile measurement reports and/or of the indicator whether the one cell fulfills a preset minimum requirement for a usage in the wireless communication network of the second type and if not, determining and indicating a proposal for optimizing parameters of the one cell so that the preset minimum requirement for a usage in the wireless communication network of the second type can be fulfilled.

49. A computer program product according to claim 37, wherein:

the mobile measurement reports are obtained for processing before the network control element, at the network control element, or after the network control element.

50. A method of analyzing an existing cellular wireless communication network of a first type, the existing wireless communication network of the first type comprising a plurality of cells, each cell comprising a transceiver network element for covering the cell and for conducting communications in the cell, wherein each transceiver network element transmits a signal in the existing wireless communication network of the first type, at least one mobile station located in one cell of said plurality cells and connected to the transceiver network element of the one cell, wherein the mobile station receives and processes the signals from the transceiver network element of the one cell and from transceiver network elements of other cells in range, and at least one network control element controlling at least the transceiver network element of the one cell in which the mobile station is located, said method comprising:

measuring in the existing wireless communication network of the first type communication connection condition parameters related to an interference situation for the one cell in which the mobile station is located, which communication connection condition parameters related to the interference situation are derived from the signals received by the mobile station from the one cell and from a plurality of the other cells;

transmitting the measured communication connection condition parameters related to the interference situation to the network control element in the form of mobile measurement reports;

storing the mobile measurement reports in a storage device;

transferring, after completion of the storing step, a set of the stored mobile measurement reports to a network analysis functionality, wherein an indicator related to a predefined communication connection condition including an interference determination of the existing wireless communication network of the first type is calculated on the basis of information in the mobile measurement reports, and a potential for reusing the one cell in a wireless communication network of a second type which is not yet established is evaluated the basis of the indicator related to the predefined communication connection condition including the interface determination of the existing wireless communication network of the first type.

51. A method according to claim 50, wherein:

the existing wireless communication network of the first type is a GSM based mobile communication network, wherein the network transceiver element is a base transceiver station element and the network control element is a base station controller, and the wireless communication network of the second type is a $3^{rd}$ generation wideband code division multiple access network.

52. A system for analyzing an existing cellular wireless communication network of a first type, the existing wireless communication network of the first type comprising a plurality of cells, each cell comprising a transceiver network element for covering the cell and for conducting communications in the cell, wherein each transceiver network element transmits a signal in the existing wireless communication network of the first type, at least one mobile station located in one cell of the plurality cells and connected to the transceiver network element of the one cell, wherein the mobile station receives and processes the signals from the transceiver network element of the one cell and from transceiver network elements of other cells in range, and at least one network control element controlling at least the transceiver network element of the one cell in which the mobile station is located, the system comprising:

measuring means for measuring in the existing wireless communication network of the first type communication connection condition parameters related to an interference situation for the one cell in which the mobile station is located, which communication connection condition parameters related to the interference situation are derived from the signals received by the mobile station from the one cell and from a plurality of the other cells, and for transmitting the measured communication connection condition parameters related to the interference situation to the network control element in the form of mobile measurement reports;

a storage means for storing the mobile measurement reports in a storage device; and means for transferring, after completion of the storing step, a set of the stored mobile measurement reports to a network analysis functionality, wherein an indicator related to a predefined communication connection condition including an interference determination of the existing wireless communication network of the first type is calculated on the basis of information in the mobile measurement reports, and a potential for reusing the one cell in a wireless communication network of a second type which is not yet established is evaluated the basis of the indicator related to the predefined communication connection condition including the interference determination of the existing wireless communication network of the first type.

53. A system according to claim 52, wherein:

the existing wireless communication network of the first type is a GSM based mobile communication network, wherein the network transceiver element is a base transceiver station element and the network control element is a base station controller, and the wireless communication network of the second type is a $3^{rd}$ generation wideband code division multiple access network.

* * * * *